(12) United States Patent
Carnegie et al.

(10) Patent No.: US 6,846,339 B2
(45) Date of Patent: Jan. 25, 2005

(54) PROCESS FOR UPGRADING LOW RANK CARBONACEOUS MATERIAL

(75) Inventors: Roderick Howard Carnegie, Woodend (AU); John Kenneth Hamilton, East Ivanhoe (AU); Alan Stuart Buchanan, Myrhee (AU)

(73) Assignee: Pacific Edge Holdings Pty Ltd (AU)

( * ) Notice: Subject to any disclaimer, the term of this patent is extended or adjusted under 35 U.S.C. 154(b) by 0 days.

(21) Appl. No.: 10/207,604

(22) Filed: Jul. 29, 2002

(65) Prior Publication Data

US 2003/0037485 A1 Feb. 27, 2003

Related U.S. Application Data

(63) Continuation of application No. PCT/AU01/00062, filed on Jan. 23, 2001.

(30) Foreign Application Priority Data

| Jan. 28, 2000 | (AU) | PQ 5324 |
| May 31, 2000 | (AU) | PQ 7872 |
| Aug. 25, 2000 | (AU) | PQ 9679 |

(51) Int. Cl.[7] .................................. C10L 5/00
(52) U.S. Cl. .................. 44/592; 44/595; 44/599; 44/608; 44/620; 44/626; 44/628
(58) Field of Search .................... 44/592, 595, 599, 44/608, 626, 628, 620

(56) References Cited

U.S. PATENT DOCUMENTS

| 3,196,000 A | 7/1965 | Meyer et al. |
| 3,469,970 A | 9/1969 | Heitmann |
| 3,486,883 A | 12/1969 | Heitmann |
| 3,753,866 A | 8/1973 | Wenzel et al. |
| 3,890,138 A | 6/1975 | Hockin |
| 3,918,958 A | 11/1975 | Heitmann |
| 3,938,987 A | 2/1976 | Ban |
| 4,181,520 A | 1/1980 | Reuter et al. |
| 4,187,079 A | 2/1980 | Weber et al. |
| 4,247,055 A | 1/1981 | Tucker, Jr. |

(List continued on next page.)

FOREIGN PATENT DOCUMENTS

| AU | 11627/83 A | 9/1983 |
| CA | 2320013 A1 | 3/2001 |
| DE | 626 590 | 2/1936 |
| DE | 21 07 775 | 9/1972 |
| DE | 33 44 044 A1 | 6/1985 |
| DE | 36 42 215 A1 | 7/1987 |
| DE | 38 06 945 A1 | 9/1989 |
| DE | 38 13 081 A1 | 11/1989 |
| EP | 1 020 535 A1 | 7/2000 |

(List continued on next page.)

OTHER PUBLICATIONS

Schubert, H., "Aufbereitung fester mineralischer Rohstoffe," 1975; pp. 70, 126, 144–145 from textbook in the German Democratic Republic with translation of relevant clauses cited by examiner's report in German Patent Office on Aug. 20, 2002.

*Primary Examiner*—Cephia D. Toomer
(74) *Attorney, Agent, or Firm*—Lerner, David, Littenberg, Krumholz & Mentlik, LLP (57) ABSTRACT

A process for upgrading brown coal is disclosed, including providing at least two converging surfaces defining a nip, wherein at least one of the surfaces is rollable in a direction toward the nip; feeding the brown coal to the nip where, by the rolling action of the rollable surface, the brown coal is subjected to shearing stresses, causing attritioning of the microporous structure of the brown coal and the release of water contained in the micropores; and continuing the shearing attritioning until the brown coal forms into a plastic mass. Processes for the production of char are also disclosed utilizing as feed material pellets formed from the upgraded brown coal produced by the above process, as well as a process for recovering metal from a metal containing material.

28 Claims, 1 Drawing Sheet

U.S. PATENT DOCUMENTS

| | | |
|---|---|---|
| 4,356,031 A | 10/1982 | Hockin et al. |
| 4,389,242 A | 6/1983 | Baker et al. |
| 4,544,451 A | 10/1985 | Weber et al. |
| 4,613,363 A | 9/1986 | Wienert |
| 4,683,030 A | 7/1987 | Weber et al. |
| 4,685,964 A | 8/1987 | Summers et al. |
| 4,687,145 A | 8/1987 | Dougan et al. |
| 4,701,184 A * | 10/1987 | Harvey et al. ............... 44/595 |
| 4,747,872 A | 5/1988 | Viramontes-Brown et al. |
| 4,758,244 A | 7/1988 | Harvey et al. |
| 4,909,450 A | 3/1990 | Henne et al. |
| 5,020,734 A | 6/1991 | Novotny et al. |
| 5,110,350 A | 5/1992 | Villarreal-Trevino et al. |
| 5,181,954 A | 1/1993 | Berrun-Castanon et al. |
| 5,213,611 A | 5/1993 | Carranza-Almaguer |
| 5,525,196 A | 6/1996 | Yuda et al. |
| 5,766,542 A | 6/1998 | Berrun-Castanon et al. |
| 5,897,829 A | 4/1999 | Kim et al. |
| 6,033,456 A | 3/2000 | Jahnke |
| 6,039,916 A | 3/2000 | Celada-Gonzalez et al. |
| 6,129,777 A | 10/2000 | Fuji et al. |
| 6,135,766 A | 10/2000 | Takeda et al. |
| 6,200,363 B1 | 3/2001 | Whitten, Jr. et al. |
| 6,214,085 B1 | 4/2001 | Calderon et al. |
| 6,224,649 B1 | 5/2001 | Villarreal-Trevino |
| 6,251,161 B1 | 6/2001 | Tateishi et al. |
| 6,254,665 B1 | 7/2001 | Matsushita et al. |
| 6,257,879 B1 | 7/2001 | Lu et al. |
| 6,258,149 B1 | 7/2001 | Sugiyama et al. |
| 6,270,552 B1 | 8/2001 | Takeda et al. |

FOREIGN PATENT DOCUMENTS

| | | |
|---|---|---|
| GB | 1186852 | 4/1970 |
| GB | 1534113 | 11/1978 |
| GB | 2004298 A | 3/1979 |
| GB | 2172586 A | 9/1986 |
| JP | 2000-205763 | 7/2000 |
| JP | 2001-133165 | 5/2001 |
| JP | 2001-123210 | 8/2001 |
| WO | WO 01/54319 A1 * | 8/2001 |

* cited by examiner

PROCESS FOR UPGRADING LOW RANK CARBONACEOUS MATERIAL

CROSS REFERENCE TO RELATED APPLICATIONS

The present application is a continuation of International Application No. PCT/AU01/00062, which was filed on Jan. 23, 2001, in the English language.

FIELD OF THE INVENTION

This invention relates generally to a process for upgrading low rank carbonaceous material, as well as a process for recovery of metal values from waste metal oxide particles. More particularly, the present invention relates to an improved process of forming pellets from low rank carbonaceous material, which pellets may also contain waste metal oxide particles. Still more particularly, the present invention extends to processes of forming char and/or metal char composites by heat treating the pellets, with optional recovery of metal values from the metal char composites.

BACKGROUND OF THE INVENTION

Low rank carbonaceous materials, such as brown coal, peat and lignite, are materials having water locked into a microporous carbonaceous structure. The water content is typically high—for example 60% or higher. This means that such materials have a low calorific value. Moreover, these materials have the undesirable mechanical properties of being soft, friable and of low density, meaning that they are difficult, messy and inconvenient to handle.

Prior processes for upgrading low rank carbonaceous materials (which for ease of discussion will be hereinafter collectively referred to as "brown coal") have included "briquetting" and solar drying.

Briquetting typically involves heating the raw brown coal to remove excess water, then pressing the cooled brown coal into briquettes using an extrusion press or roll briquetting machine. However, briquetting is an expensive process due to the requirement for thermal energy and the mechanical wear on the extrusion press or roll briquetting machine.

The solar drying process involves milling of the brown coal with addition of water for long periods (e.g. up to 16 hours), then solar drying of the milled slurry in shallow ponds. This process is lengthy—particularly the solar drying step which may take up to several months—and energy intensive.

Another proposal mechanically releases water from brown coal by physically breaking up the coal. However, this process is inconvenient and time consuming and still requires lengthy air drying of the final product.

It is accordingly an object of the present invention to provide a process for upgrading brown coal which overcomes, or at least alleviates, one or more disadvantages of the prior art.

SUMMARY OF THE INVENTION

According to the present invention, there is provided a process for upgrading low rank carbonaceous metal, such as brown coal (as hereinbefore defined), including providing two or more converging surfaces defining a nip therebetween, wherein at least one of two or more surfaces is rollable in a direction toward the nip; feeding the brown coal to the nip where, by the rolling action of the at least one rollable surface, the brown coal is subjected to shearing stresses, causing attritioning of the microporous structure of the brown coal and the release of water contained in the micropores; continuing the shearing attritioning until the brown coal forms into a plastic mass.

The present invention also provides upgraded brown coal formed from the process defined in the preceding paragraph.

The present invention further provides a process for the production of char, utilizing as feed material pellets formed from the upgraded brown coal produced by the above process.

The present invention still further provides char produced from the process of the preceding paragraph.

Moreover, the present invention still further provides a process for recovering metal from a metal containing material including providing two or more converging surfaces defining a nip therebetween, wherein at least one of the surfaces is rollable in a direction toward the nip; feeding low rank carbonaceous metal, such as brown coal (as herein defined), and the metal containing material to the nip where, by the rolling action of the at least one rollable surface, the brown coal is subjected to shearing stresses, causing attritioning of the microporous structure of the brown coal and the release of water contained in the micropores; continuing the shearing attritioning until the brown coal and metal containing material form into a composite plastic mass; and heating the composite mass in order to pyrolyse the brown coal and form sufficient reductant to reduce the metal containing material to the metal, thereby producing a reduced composite including the reduced metal and a carbonaceous phase.

The present invention also provides a composite of metal containing material and upgraded brown coal formed according to the above process. Further, the present invention provides a reduced composite formed according to the above process.

In accordance with the present invention, a process has been provided for upgrading low rank carbonaceous material having a microporous structure and containing water comprising providing at least two converging surfaces defining a nip therebetween, wherein at least one of the at least two surfaces is rollable in a direction toward the nip; feeding the low rank carbonaceous material to the nip where, by the rolling action of the at least one of the at least two surfaces, the low rank carbonaceous material is subjected to shearing stresses, causing attritioning of the microporous structure of the low rank carbonaceous material and the release of the water contained in the micropores; and continuing the attritioning until the low rank carbonaceous material forms into a plastic mass. Preferably, the low rank carbonaceous material comprises brown coal.

In accordance with one embodiment of the process of the present invention, the at least one of the at least two surfaces comprises the surface of at least one roller contained in a mill. Preferably, the mill comprises a rotating roll type pellitizing mill. In a preferred embodiment, the mill does not include an air separator.

In accordance with another embodiment of the process of the present invention, the process includes extruding the attritioned low rank carbonaceous material either substantially immediately after or concurrently with the attritioning. Preferably, the attritioning and extruding steps occur in a single operation. In a preferred embodiment, the single operation utilizes a single apparatus. In another embodiment, the extruding comprises forcing the attritioned low rank carbonaceous material through apertures by the rolling action of the at least one of the at least two surfaces.

Preferably, the apertures have a decreasing diameter as aid attritioned low rank carbonaceous material is pushed therethrough. In a preferred embodiment, the apertures have a diameter ranging from about 8 to about 20 mm and a length ranging from about 15 to about 100 mm, and preferably the apertures are provided in at least one of the at least two converging surfaces.

In accordance with another embodiment of the process of the present invention, the process includes cutting the extruded low rank carbonaceous material into pellets. Preferably, the process includes using the pellets as feed material in a process for the production of char. In a preferred embodiment, the process for the production of char is conducted in a rotary kiln. Preferably, the process for the production of char includes pyrolysis of the low rank carbonaceous material in the pellets at a temperature of between 400 and 700° C.

In accordance with another embodiment of the process of the present invention, the process includes mixing a metal containing material with the low rank carbonaceous material prior to or during the attritioning in order to form a composite plastic mass. Preferably, the metal containing material comprises dust generated from the melting of iron and steel.

In accordance with the present invention, a process for recovering metal from a metal containing material is provided, the process comprising providing at least two converging surfaces defining a nip therebetween, wherein at least one of the at least two surfaces is rollable in a direction toward the nip; feeding a low rank carbonaceous material having a microporous structure and containing water and the metal containing material to the nip where, by the rolling action of the at least one of the at least two rollable surfaces, the low rank carbonaceous material is subjected to shearing stresses, causing attritioning of the microporous structure of the low rank carbonaceous material and the release of the water contained in the micropores; continuing the attritioning until the low rank carbonaceous material and the metal containing material form into a composite plastic mass; and heating the composite mass in order to pyrolyse the low rank carbonaceous material and form sufficient reductant to reduce the metal containing material to the metal, thereby producing a reduced composite including the reduced metal and a carbonaceous phase. Preferably, the metal containing material comprises a metal oxide or sulphide, such as an oxide or sulphide of iron, zinc, lead, copper or cadmium. Preferably, the metal containing material is the oxide or sulfide of iron, zinc, lead, copper or cadmium. In a preferred embodiment, the metal containing material comprises the oxide or sulphide of iron and copper. Preferably, the metal containing material comprises dust generated from the melting of iron and steel.

In a preferred embodiment, the dust generated from the melting of the iron and steel comprises dust generated from the melting of iron and steel in an electric arc furnace.

In accordance with another embodiment of the process of the present invention, the process includes extruding the composite plastic mass either substantially immediately after or concurrently with the attritioning prior to the heating step. Preferably, attritioning and extruding steps occur in a single operation. In a preferred embodiment, the single operation utilizes a single apparatus. Preferably, the single apparatus comprises a rotating roll type pelletizing mill, and preferably not including an air separator. In a preferred embodiment, the extruding comprises forcing the composite mass through apertures by the rolling action of the at least one of the at least two surfaces. Preferably, the apertures have a decreasing diameter as the composite mass is pushed therethrough. More preferably, the apertures have a diameter ranging from about 8 to about 20 mm and a length ranging from about 15 to about 100 mm, and are preferably provided in at least one of the at least two converging surfaces.

In accordance with another embodiment of the process of the present invention, the process includes cutting the extruded composite mass into pellets prior to the heating step.

In accordance with yet another embodiment of the process of the present invention, the heating step is conducted in a semi-closed retort or kiln. In a preferred embodiment, the kiln comprises a rotary kiln.

In accordance with another embodiment of the process of the present invention, the pyrolysis of the low rank carbonaceous material takes place at a temperature between 500 and 700° C.

In accordance with another embodiment of the process of the present invention, the dust includes iron oxide, and wherein the reduced metal formed by reducing the iron oxide in the heating step comprises Direct Reduced Iron. Preferably, the process includes subjecting the Direct Reduced Iron to hot or cold briquetting, preferably cold briquetting. In a preferred embodiment, the process includes cooling the Direct Reduced Iron in an inert atmosphere to about ambient temperature prior to the cold briquetting.

In accordance with another embodiment of the process of the present invention, the process includes separating the reduced metal from the reduced carbonaceous phase in the reduced composite. In a preferred embodiment, the process includes heating the reduced composite in the presence of oxygen in order to combust the reduced carbonaceous phase and increase the temperature of the reduced composite sufficiently to melt the iron in the composite.

In accordance with the present invention, upgraded low rank carbonaceous material is formed according to the process set forth above.

In accordance with another aspect of the present invention, char is produced according to the process set forth above.

In accordance with another aspect of the present invention, a composite of metal containing material and upgraded low rank carbonaceous material is formed according to the process set forth above.

In accordance with another aspect of the present invention, a reduced composite is formed according to the process set forth above.

In accordance with yet another aspect of the present invention, metal is formed according to the process set forth above.

Accordingly, the brown coal is comminuted by a process involving shearing attritioning as distinct from simple grinding. Typically this process takes place in a mill. Preferably the mill includes at least one roller. Preferably, the mill does not include an air separator as such a device is not compatible with the process of the invention and can interfere with the shearing/attritioning and/or extrusion of the plastic mass.

It is believed that the rolling action of the at least one converging surface towards the nip is advantageous because the brown coal is actively directed into the nip and subjected to more efficient shearing forces there than would be the case using, for example, a blending or kneading apparatus simply having rotating paddles. In such an apparatus, shearing stresses are produced in a narrow gap between the walls of the blender and the rotating paddles and are generally not as efficient as the shearing stresses generated during the process of the present invention.

The shearing attritioning may be preceded, if necessary, by a size reduction step in which the brown coal is subjected to grinding, such as in a hammer mill.

The shearing attritioning is preferably effected in a rotating roll type pelletizing mill. Such a mill typically comprises a housing, preferably drum or cylindrical in shape, within which is provided at least one rollable curved surface, typically the surface of a roll, preferably a cylindrical shaped roll. The curved inner surface of the housing and the curved surface of, for example, the roll are positioned relative to each other so as to provide two converging surfaces between which is defined a nip. This typically will require that the axis of rotation of the roll will be eccentric relative to the axis of rotation of the housing. In use, there is relative rotational movement between the two surfaces. This may be effected by rotation of the housing about its axis and/or rotation of the roll about its axis. Alternatively, the housing may be stationary and the roll rotates about the axis of the housing as well as rotating about its own axis. The rotation of the roll about the axis of the housing may be effected by means of an arm mounted for rotatable movement at the axis of the housing, and having at one end thereof the roll also mounted for rotatable movement. The relative rotational movement of the two surfaces is such as to cause the brown coal to be forced into the nip, where it is subjected to shearing attritioning.

In one preferred embodiment of the invention, an arm is mounted for rotatable movement at the axis of the housing and a roll is mounted at either end of the arm. In such an arrangement the mill has in effect two pairs of converging surfaces, with each roll providing a rollable surface defining a nip where the rollable surface is closest to the inner surface of the housing.

It is believed that the shearing attritioning of the coal particles causes breakage of bonds between coal particles with consequential release of water trapped in micropores of the coal structure.

Preferably, the attritioned carbonaceous material is then subjected to extrusion which further shears the material. Preferably, the extrusion process occurs substantially immediately after or concurrently with the shearing attritioning. Most preferably, the shearing attritioning and extrusion occur in a single operation, typically in a single apparatus, which avoids the need to transfer the material from an attritioning apparatus to an extruder. The extrusion is advantageously effected by forcing the attritioned material through tapered apertures, having decreasing diameter as the material is pushed through. The tapered apertures effect the application of very high pressures to the material during extrusion, causing further mechanical release of water from the micropores of the brown coal and forcing the coal particles into close proximity thereby promoting renewed bonding between the particles. The apertures typically have a diameter ranging from about 8 to about 20 mm, preferably about 8 to about 15 mm, more preferably from about 10 to about 12 mm. The length of the apertures typically range from about 15 to about 100 mm, preferably from about 30 to about 90 mm, more preferably from about 30 to about 60 mm.

In another type of rotating roll type pelletizing mill, one or more rollable curved surfaces are positioned closely adjacent a substantially planar surface, with each rollable curved surface together with the planar surface defining a nip therebetween. The rollable curved surface is typically the surface of a cylindrical shaped roll. Preferably, the axis of rotation of each roll is essentially parallel with the planar surface. Typically the one or more cylindrical rolls are positioned for rotatable movement closely above the planar surface. The one or more rotatable rolls may additionally be mounted for rotatable movement about an axis perpendicular to the planar surface. The attritioned brown coal is then subjected to extrusion by being forced through apertures in a die, the upper surface of which forms the planar surface. Cylinders of extruded brown coal exit the other side of the die where they are cut into pellets.

Surprisingly the inventors have discovered that rotating roll type pelletizing mills, which are commonly used in the production of pelleted animal feed, fertilizers and pharmaceuticals, or in the densification of dusty materials, are unexpectedly suitable for use in the process of the present invention. For example, suitable machines are those sold by the company Sprout Waldron & Company, Inc. in Muncy, Pa. 17745, United States of America, such as the pellet mill having the trade name Sprout Waldron Junior Ace, and those sold by California Pellet Mill. Further, suitable machines also include flat die pelleting presses, such as those sold by Amandus Kahl GmbH & Co.

In using a rotating roll type pelletizing mill, such as the Sprout Waldron pelleting mills, the brown coal is subjected to shearing attritioning at the nip between the surface of each roll and another surface in the mill. That other surface also forms part of an extruder die, having holes through which the attritioned brown coal is extruded. Accordingly, simultaneously with the shearing attritioning at each nip, the attritioned brown coal is forced through the holes of the die by the action of the roll. The attritioned brown coal is thereby compressed into solid cylinders which are cut into pellets as they emerge by cut-off knives. The combined operations of shearing, attritioning and extrusion occur in a very short time period (e.g. fractions of a second), thus avoiding lengthy time periods which would otherwise be required to first form an extrudable paste and then transfer the paste to an extruder from which pellets are produced.

In the Sprout Waldron pelleting mill, shearing attritioning occurs at the nip between the surface of each roll and the inner wall of the rotating housing. The housing is also an extruder die having tapered holes therethrough with decreasing diameter from the inner wall to the outer wall. Tapered holes ensure the application of very high pressures to the material during extrusion. A rotatable arm is mounted for rotatable movement about the axis of the housing and a roll is mounted for rotatable movement at each end of the arm. The rotatable arm is typically powered by a 50 hp motor. The diameter of the tapered holes in the die can be as small as 10 to 12 mm. It will therefore be appreciated that an extremely efficient shearing force is exerted on the brown coal at the nip and that it is subjected to very high pressure as it is forced through the tapered holes, thereby forcing the coal particles into very close proximity with each other. Accordingly, water loss from the microstructure and renewed bonding between coal particles is maximized. The act of extrusion also substantially increases the temperature of the emerging pellets, which may be as high as 50° C. Such a high temperature enhances evaporation of surficial water from the pellets released from the micropores. This feature of the process of the invention is extremely advantageous since it ensures substantial water loss from the pellets in the very early stage of the drying process, thereby considerably minimizing the overall drying time.

In some circumstances, pelletizing machines sold by Warren & Baerg Manufacturing Inc., such as the Model 250

Cuber, may be used. However due to the less effective shearing action of this machine, it may be necessary to additionally use a further attritioner and/or extruder in combination with it.

The process of the invention may advantageously be used to produce feed material for use in a subsequent process for the production of char.

Alternatively, the process is particularly advantageous in the production of composites of attritioned brown coal with a metal containing material. These composites can be subsequently used as feed material in a process for recovery of the metal, in which the composite pellets are heated to a sufficiently high temperature to effect pyrolysis of the brown coal and consequent reduction of the metal containing material (typically metal oxide or sulphide) to its metal. The sheared and attritioned brown coal used in such composites exhibits an enhanced reducing potential compared with a brown coal which has been comminuted by simple grinding. As a result, reduction of the metal containing material can advantageously take place at temperatures significantly lower than conventional reduction temperatures.

Accordingly, significant advantages can be achieved by shearing attritioning of the brown coal, which are not widely recognized. Where shearing attritioning is conducted to upgrade brown coal per se, or to produce feed for char production, more highly efficient water removal is achieved and the subsequent pyrolysis of brown coal may occur at a lower than conventional pyrolysis temperature. Furthermore, shear attritioned brown coal in composites of brown coal and metal containing material has a substantially increased reduction potential, as compared with brown coal which has been comminuted by simple grinding.

BRIEF DESCRIPTION OF THE DRAWINGS

The present invention will become more readily apparent from the following detailed description in connection with the accompanying drawings, wherein.

DETAILED DESCRIPTION

Figure 1:
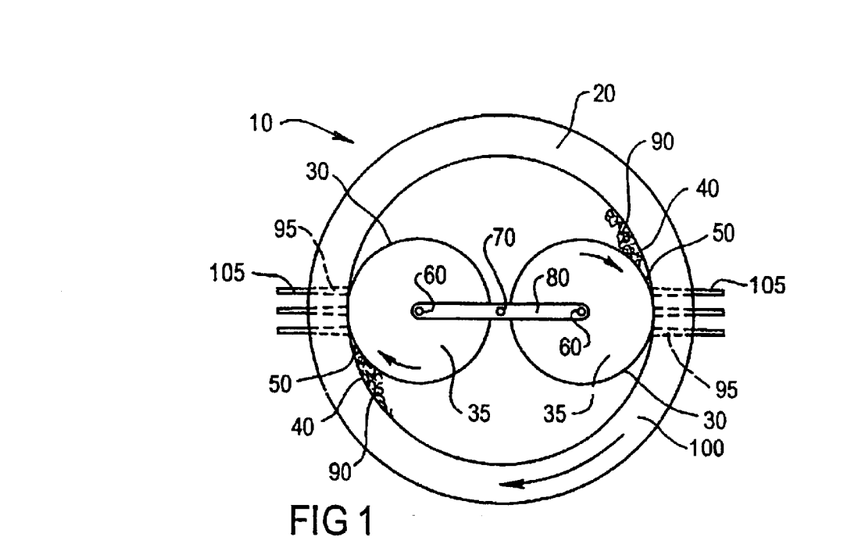
FIG. 1 is a side, elevational, schematic view of a first pelletizing mill suitable for use in the method of the present invention.
Figure 2:
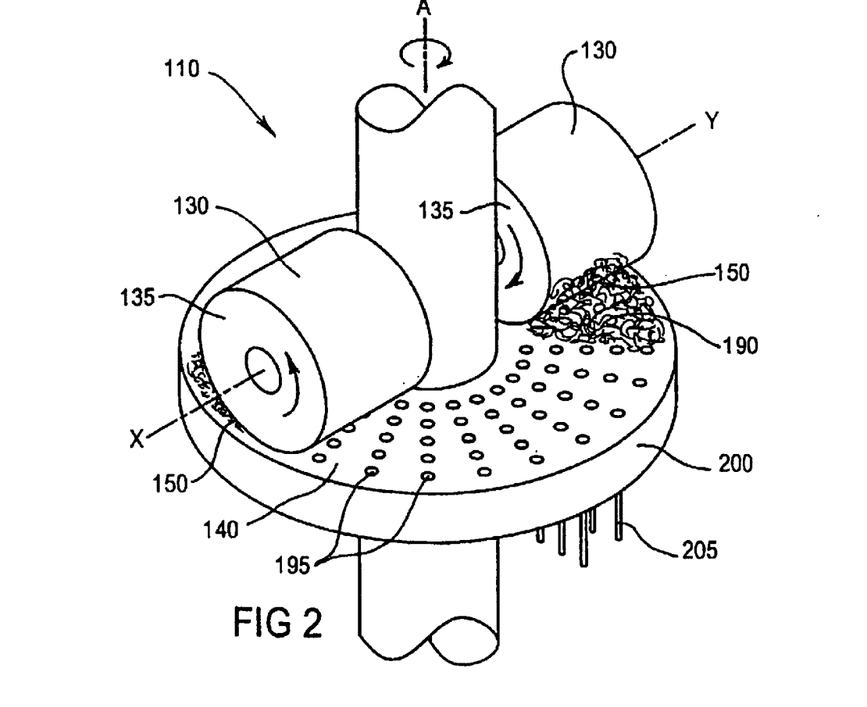
FIG. 2 is a side, perspective, schematic view of a second pelletizing mill suitable for use in the method of the present invention.

Two different embodiments of pelletizing mills suitable for use in the method of the invention are illustrated schematically in FIGS. 1 and 2.

One type of rotating roll type pelletizing mill 10, illustrated schematically in FIG. 1, comprises a housing 20, having a cylindrical shape, within which is provided two rollable curved surfaces 30, each comprising the surface of a cylindrical shaped roll 35. The curved inner surface 40 of the housing 20 and the curved surface 30 of each roll are positioned relative to each other so as to provide two converging surfaces between which is defined a nip 50. This requires that the axis of rotation 60 of the roll 35 be eccentric relative to the axis of rotation 70 of the housing 20. In use, there is relative rotational movement between the two surfaces 30,40 in order to effect the rolling action. This may be effected by rotation of the housing 20 in the direction of the arrow about its axis and/or rotation of each roll 35 about its axis 60, also as indicated by the direction of the arrow. Alternatively, the housing 20 may be stationary and each roll 35 rotates about the axis 70 of the housing 20 as well as rotating about its own axis 60. The rotation of each roll 35 about the axis 70 of the housing 20 is effected by means of an arm 80 mounted for rotatable movement at the axis 70 of the housing 20. A roll 35 is mounted at either end of the arm 80. In such an arrangement the mill has in effect two pairs of converging surfaces, with each roll 35 providing a rollable surface 30 defining a nip 50 where the rollable surface 30 is closest to the inner surface 40 of the housing 20.

The attritioned carbonaceous material 90 is then subjected to extrusion which further shears the material. The shearing attritioning and extrusion occur in a single operation which avoids the need to transfer the material from an attritioning apparatus to an extruder. The extrusion is effected by forcing the attritioned material 90 through tapered apertures 95, having decreasing diameter as the material is pushed through. For simplicity, only a few of the apertures are depicted in FIG. 1 whereas in fact the apertures 95 extend substantially completely around the entire housing 20, such that the housing 20 functions as a die 100. The tapered apertures 95 effect the application of very high pressures to the material during extrusion, causing further mechanical release of water from the micropores of the brown coal and forcing the coal particles into close proximity thereby promoting renewed bonding between the particles. The extruded material forms into cylinders 105 which may be cut into pellets.

In another type of rotating roll type pelletizing mill 110, illustrated schematically in FIG. 2, one or more rollable curved surfaces 130 are positioned closely adjacent a substantially planar surface 140, with each rollable curved surface 130 together with the planar surface 140 defining a nip 150 therebetween. The rollable curved surface 130 is the surface of a cylindrical shaped roll 135. The axis of rotation X,Y of each roll 135 is essentially parallel with the planar surface 140. Each cylindrical roll 135 is positioned for rotatable movement closely above the planar surface 140. Each rotatable roll 135 is additionally mounted for rotatable movement about an axis A perpendicular to the planar surface 140. The attritioned brown coal 190 is subjected to extrusion by being forced through apertures 195 in a die 200, the upper surface of which forms the planar surface 140. Cylinders of extruded brown coal 205 exit the other side of the die 200 where they can be cut into pellets.

The pellets produced by the process of the present invention can advantageously be used as feed material for subsequent production of carbon char. The pellets are typically fed to a kiln or a retort, preferably a rotary kiln. Typically, the rotary kiln comprises an inclined, cylindrical furnace which rotates slowly about its axis. The pellets are fed into the upper end and they move slowly through to the lower end under the influence of gravity and with the assistance of spiral baffles inside the furnace. While the initial start up of the kiln is effected using an external source of fuel (such as natural gas, oil or pulverized coal) combustible gases given off the pellets during the process enable the process to be subsequently self fuelling.

The brown coal containing pellets typically contain around 12% total water, plus carbon, volatiles and minerals derived from the original brown coal. During heating of the pellets, free water is first evolved, followed by combined water once the temperature reaches about 250° C. With increasing temperature, volatiles, mainly hydrocarbons such as methane, are released between 400 and 700° C. These volatiles largely decompose to carbon monoxide, hydrogen and some carbon dioxide. The product of the charring process is the original carbon plus ash derived from the minerals.

It is an advantage of the present invention that the pellets produced from the inventive shearing attrition and extrusion process are sufficiently dense and strong that they can be successfully used as feed material in a rotary kiln without significant break up. This is a considerable advance over prior art briquettes which tend to break when processed in a rotary kiln.

In an alternative embodiment of the process of the present invention, metal value containing material can be combined with the brown coal during shearing attritioning and incorporated in the subsequently produced pellets. The production of such composite pellets may be desirable in order to convert difficult to handle, fine metal oxide dusts, such as that produced as waste from electric arc furnaces, into a more convenient and easy to handle form. Such pellets can also be used as feed material in a subsequent process to reduce and recover the metal values.

This modification of the inventive process will now be described with particular emphasis on its application to the recovery of metal values from dusts generated from the melting of iron and steel, particularly the melting of steel scrap in electric arc furnaces. However, it is to be understood that the process is not limited to such use, and can be generally applied to recovery of metal values from any materials, particularly particulate materials. Other metal containing material may include copper containing material, such as copper sulphides and/or copper oxides.

Dusts generated during the melting of iron and steel, more particularly the melting of steel scrap in electric arc furnaces, commonly contains a good deal of zinc (say 20 to 30%) together with an amount of iron and much smaller quantities of lead and various other minor elements. The safe disposal of such material presents substantial difficulties because, if used in land fill operations soluble elements such as zinc, cadmium and copper may readily leach into the ground water. If stockpiled such material is subject to wind dispersal and the considerable quantities generated render such an approach impractical. In some current operations the dust is transported to separate fuming plants for treatment but this is costly and results in the recovery of only a proportion of the contained zinc and none of the iron.

The process of the present invention enables the recovery of very high proportions of all elements involved in economic forms without leaving any hazardous residues. Moreover, the treatment plants may be small in size, not capital intensive and may be located conveniently near to the electric arc furnace plants mentioned above.

The proposed process uses low rank carbonaceous materials, such as brown coal, peat, soft lignites of relatively high water content or plant derived materials either singly or in combination in thorough mixture with the dust in the form of composite pellets or agglomerates using the process of the present invention.

As previously described, brown coal releases water contained in its microstructure when shear attritioned to form a wet, smooth plastic mass, then the coal particles rapidly rebond with substantial loss of water to form a relatively hard dense product of low water content. The electric arc furnace dust added to the coal prior to shearing attritioning becomes incorporated into the final hard product in very close association with the coal particles.

The composite pellets thus produced can be used as feed material in a subsequent hot briquetting process such as to form reduced carbon/iron briquettes and/or in a process to recover metal values from the electric arc furnace dust.

When the hard dry pellets are heated in, for instance, a semi-closed retort or kiln, preferably a rotary kiln, to maintain the reducing atmosphere generated by the coal, the pyrolyzing brown coal can exert an extremely strong reducing effect at quite low temperatures (500–700° C.). The finely particulate metal oxides in any furnace dust contained within the composites are thus exposed to the full reducing action and can be rapidly and completely reduced to the metallic state. This applies not only to the zinc, lead, copper and cadmium but also to the iron which is a major component of the dust.

While not wishing to be restricted to a particular reduction mechanism, when iron oxides are present in the composite pellet, as the kiln temperature rises above 500° C., it is believed that reduction of hematite ($Fe_2O_3$) to magnetite ($Fe_3O_4$) occurs and, in turn, reduction of the latter to wustite (FeO) then occurs. Subsequently, wustite is reduced to metallic iron from around 900° C. During pyrolysis of the brown coal, sufficient volatiles are preferably produced to satisfy the demand for chemical reductant as well as to provide at least most of the fuel for the process. The reduced pellets therefore contain Direct Reduced Iron (DRI), which is a generic term for the product of the process in which oxidic iron ores or concentrates are reduced to metallic iron in their solid state by reductants such as hydrogen, carbon monoxide and coal.

An advantage of the present invention is that the temperature of reduction of the iron oxide in the composite pellets takes place around 500–700° C., which is considerably lower than the reduction temperature ordinarily required; namely, about 1200° C.

The reduced pellets may be further processed by hot or cold briquetting possibly after crushing. Where the reduced pellets containing DRI are subjected to hot briquetting, this results in Hot Briquetted Iron (HBI). This product typically takes the form of dense, hard pellets containing intimately mixed metallic iron and carbon. The hot forming process densifies material, e.g. by reducing porosity, and excludes air and/or moisture, thereby minimizing oxidation of iron and carbon in the briquettes. The HBI can be stock piled and may subsequently be used as feedstock in furnaces for making iron and/or steel.

An advantageous feature of the present invention is that the reduced pellets may alternatively be subjected to cold briquetting. In this process, the reduced pellets are allowed to cool in an inert atmosphere to about ambient temperature before being formed into briquettes. The cooling in the presence of an inert atmosphere minimizes oxidation of iron and carbon in the pellets prior to their formation into briquettes. The pellets may be crushed and may be blended with a binder or other additive before briquetting. As for hot briquetting, cold briquetting densifies the material by reducing porosity and excludes air and moisture to minimize oxidation of iron and carbon.

Subsequent to, or instead of, hot or cold briquetting, the process may further include separation of the reduced metals from the residual char and gangue. Where the pellets include reduced metals derived from electric arc furnace dusts, that separation may be by one of two options.

In the first option, the metallic zinc, lead and cadmium recovered are volatilized and the vapours are conducted to a suitable condenser with the aid of an inert carrier gas, e.g. nitrogen, argon. This is achieved by raising the temperature progressively to about 1000° C. until complete removal of the volatile metals has taken place. The residual composites will then contain only reduced iron, carbon and gangue and may be returned to the furnace. Care must be taken throughout the process to ensure that no oxidizing gases are present during volatilisation.

The second, preferred alternative is to produce zinc oxide and melted iron directly from the hot reduced composites. For this purpose the reduced composite pellets, at about 700° C. may be discharged into a suitable vessel with provision for bottom blowing and oxygen injection at an appropriate rate. Combustion of the hot char will cause a rapid rise in temperature with volatilisation of the zinc, lead and cadmium which will then oxidize in the atmosphere above the charge. The oxidized metals may readily be collected in a bag house system. The bulk of the residual iron in the burning composite will rapidly melt, thus permitting effective recovery contained in the original furnace dust.

An appreciation of the volatilities of the base metals concerned will assist an understanding of the principles underlying the process of the present invention. The boiling points of zinc, cadmium and lead are set out in Table 1.

TABLE I

| METAL | BOILING POINT ° C. |
|---|---|
| Zinc | 906 |
| Cadmium | 765 |
| Lead | 1740 |

In the first stage of pyrolysis/reduction of the composites the temperature should be limited to about 700–725° C. so as to avoid volatilisation of the zinc and cadmium. This temperature range is sufficient to achieve full reduction of the metal oxides and removal of most of the organic volatiles (mainly phenols) from the heated coal.

It should be noted that although lead is relatively non-volatile that there is some carry-over of this metal during heating to 1000° C. in a carrier gas stream—presumably in the form of micro-droplets.

EXAMPLES

The process of the present invention will be better understood by reference to the following non-limiting Examples.

Example 1

Formation of Upgraded Brown Coal Pellets.

Loy Yang brown coal having 60% by weight water as mined, reducing to 55% by weight water after storage in bags, was subjected to shearing attritioning and extrusion in a Sprout-Waldron Junior Ace pelleting mill. The wet pellets as formed had a diameter of 12 mm. The pellets were allowed to dry naturally in an open shed with free air movement. The maximum day temperature during the trial was 26 to 28° C. The water content of the pellets was measured over time and is presented in Table 2.

TABLE 2

| TIME | WATER % |
|---|---|
| Before pelletizing | 55 |
| 15–20 minutes after formation | 38 |
| 1 hour after pellet formation | 36.5 |
| 4 hours after pellet formation | 23.0 |
| 20 hours after pellet formation (next day) | 17.5. |

These results illustrate the very rapid water loss and accompanying densification hardening attainable using the procedure of this invention. After 20 hours the above pellets were suitable for subsequent applications.

Examples 2 and 3

Recovery of Metal Values from Composite Pellets of Brown Coal and Electric Arc Furnace Dust In each case brown coal from Morwell, Victoria together with electric arc furnace dust from Smorgon Steel, Laverton, Victoria were used. The dust had the following compositions as set out in Table 3.

TABLE 3

| ELEMENT | % BY WEIGHT |
|---|---|
| Zinc | 27.45 |
| Iron | 21.08 |
| Calcium | 3.49 |
| Lead | 2.36 |
| Manganese | 1.16 |
| Together with the minor elements | PARTS PER MILLION |
| Copper | 1730 |
| Cadmium | 375 |
| Nickel | 206 |
| Cobalt | 5 |

Example 2

Composite pellets made in accordance with the process of the present invention and having a coal:dust ratio of 1:2 were used as feed to a retort furnace. The retort was heated to about 700° C. over fifty minutes and the temperature then raised progressively first to 940° C. and finally to 1050° C. over a thirty minute period. During the latter stages of heating a stream of pre-heated oxygen free nitrogen was used to carry the volatile metals out of the retort to a simple tube condenser isolated from the atmosphere by a water trap. The efficiency of the process in this example was determined by analysis of four separate samples of the residual cooled char composites in the retort. The results are presented in Table 4.

TABLE 4

| SAMPLE | % ZINC VOLATILIZED |
|---|---|
| 1 | 97.52 |
| 2 | 97.27 |
| 3 | 97.67 |
| 4 | 97.51. |

The condensed metal had the following composition as set out in Table 5.

TABLE 5

| ELEMENT | % BY WEIGHT |
|---|---|
| Zinc | 99.3 |
| Lead | 0.50 |
| Iron | 0.12 |
| Magnesium | 0.0003 |
| Manganese | 0.002 |
| Copper | 0.0001 |
| Cadmium | 0.0025 |
| Nickel | 0.024 |
| Cobalt | 0.001. |

Example 3

Composite pellets made according to the process of the present invention and having a coal:dust ratio of 1:1 were used as feed to a retort furnace. The retort was heated to about 700° C. over 60 minutes and the temperature was then raised to 1170° C. over a further 80 minutes, the second heating stage being accompanied by a stream of nitrogen through the retort to carry the volatilized metal to the condenser. Efficiency was determined by measuring both recovered metal (zinc) in the condenser and residual zinc in the cooled char. Four separate determinations indicated 100% volatilisation.

The composition of the condensed metal is set out in Table 6.

TABLE 6

| ELEMENT | % BY WEIGHT |
|---|---|
| Zinc | 97.3 |
| Lead | 1.32 |
| Iron | 0.32 |
| Manganese | 0.058 |
| Copper | 0.006 |
| Cadmium | 0.175 |
| Nickel | 0.0026 |
| Cobalt | 0.001. |

Analysis of the condensed metal indicated rather more transport of lead than might be expected from the higher final temperature.

The preceding Examples demonstrate that the process of the present invention enables virtually complete separation and recovery of zinc from furnace dusts.

Examples 4 and 5

Preparation of Cold Briquettes.

Example 4

Example 4 demonstrates the preparation of briquettes by compaction of cold sponge iron (DRI) prepared by the reduction of iron oxides in composite pellets prepared according to the present invention and allowed to cool to ambient temperature.

45 g of cold sponge iron was blended with 1.0 g of a binder and 1.0 ml of water and compacted using a load of 48 tonnes (264 MPa). The resultant cold briquette required only limited air drying prior to utilisation as feedstock for further processing at ambient temperature.

Example 5

Example 5 further demonstrates the method of preparation of cold briquetted sponge iron prepared by the reduction of iron oxides in composite pellets formed according to the present invention.

45 g of cold sponge iron and impurity phases were crushed to a uniform mixture and blended with 1 g of a binder, in this case stearic acid. The resultant mixture was compacted using a load of 30 tonnes (165 MPa). The resultant briquettes required no further processing prior to use as feedstock for the production of iron.

Further it is to be understood that various alterations, modifications and/or additions may be introduced into the constructions and arrangements of steps previously described without departing from the spirit or ambit of the invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A process for upgrading low rank carbonaceous material having a microporous structure and containing water comprising:

providing a rotating roll type pelletizing mill including at least one roller and having at least two converging surfaces defining a nip therebetween, wherein at least one of said at least two surfaces is the surface of said at least one roller and is rollable in a direction toward said nip and further wherein tapered apertures are provided in one or more of said surfaces;

feeding said low rank carbonaceous material to said nip where, by the rolling action of said at least one of said at least two surfaces, said low rank carbonaceous material is subjected to shearing stresses, causing attritioning of said microporous structure of said low rank carbonaceous material and the release of said water contained in said micropores; and continuing said attritioning until said low rank carbonaceous material forms into a plastic mass;

extruding said attritioned low rank carbonaceous material either substantially immediately after or concurrently with said attritioning, by forcing said attritioned low rank carbonaceous material through the apertures by the rolling action of said at least one of said at least two surfaces, wherein said apertures have a decreasing diameter as said attritioned low rank carbonaceous material is pushed therethrough to thereby subject the attritioned low rank carbonaceous material to sufficiently high pressures to cause further mechanical release of water from said micropores and to promote renewed bonding between the particles of the low rank carbonaceous material; and forming said extruded low rank carbonaceous material into pellets.

2. The process of claim 1, wherein said low rank carbonaceous material comprises brown coal.

3. The process of claim 1, wherein said mill does not include an air separator.

4. The process of claim 1, wherein said apertures have a diameter ranging from about 8 to about 20 mm and a length ranging from about 15 to about 100 mm.

5. The process of claim 1, including cutting said extruded low rank carbonaceous material into pellets.

6. The process of claim 5, including using said pellets as feed material in a process for the production of char.

7. The process of claim 6, including conducting said process for the production of char in a rotary kiln.

8. The process of claim 6, wherein said process for the production of char includes pyrolysis of said low rank carbonaceous material in said pellets at a temperature of between 400 and 700° C.

9. The process of claim 1, including mixing a metal containing material with said low rank carbonaceous material prior to or during said attritioning in order to form a composite plastic mass.

10. The process of claim 9, wherein said metal containing material comprises dust generated from the melting of iron and steel.

11. A process for recovering metal from a metal containing material, said process comprising:

providing a rotating roll type pelletizing mill including at least one roller and having at least two converging surfaces defining a nip therebetween, wherein at least one of said at least two surfaces is the surface of said at least one roller and is rollable in a direction toward said nip and further wherein tapered apertures are provided in one or more of said surfaces;

feeding a low rank carbonaceous material having a microporous structure and containing water and said metal containing material to said nip where, by the rolling action of said at least one of said at least two rollable surfaces, said low rank carbonaceous material is subjected to shearing stresses, causing attritioning of said microporous structure of said low rank carbonaceous material and the release of said water contained in said micropores;

continuing said attritioning until said low rank carbonaceous material and said metal containing material form into a composite plastic mass;

extruding said composite plastic mass either substantially immediately after or concurrently with said attritioning, by forcing said composite mass through the apertures by the rolling action of said at least one of said at least two surfaces, wherein said apertures have a decreasing diameter as said composite mass is pushed therethrough to thereby subject said composite mass to sufficiently high pressures to cause further mechanical release of water from said micropores and to promote renewed bonding between the particles of the low rank carbonaceous material;

forming said extruded composite mass into pellets; and heating said pellets in order to pyrolyse said low rank carbonaceous material and form sufficient reductant to reduce said metal containing material to said metal, thereby producing a reduced composite including said reduced metal and a carbonaceous phase.

12. The process of claim 11, wherein said metal containing material, comprises a metal containing material selected from the group consisting of the metal oxides and sulphides.

13. The process of claim 12, wherein said metal containing material is selected from the group consisting of the oxides and sulfides of iron, zinc, lead, copper and cadmium.

14. The process of claim 11, wherein said metal containing material comprises a metal containing material selected from the group consisting of the oxides or sulphides of iron and copper.

15. The process of claim 11, wherein said metal containing material comprises dust generated from the melting of iron and steel.

16. The process of claim 15, wherein said dust generated from the melting of said iron and steel comprises dust generated from the melting of iron and steel in an electric arc furnace.

17. The process of claim 11, wherein said rotating roll type pelletizing mill does not include an air separator.

18. The process of claim 11, wherein said apertures have a diameter ranging from about 8 to about 20 mm and a length ranging from about 15 to about 100 mm.

19. The process of claim 11, including cutting said extruded composite mass into pellets prior to said heating step.

20. The process of claim 11, including conducting said heating step in a semi-closed retort or kiln.

21. The process of claim 20, wherein said kiln comprises a rotary kiln.

22. The process of claim 11, wherein said pyrolysis of said low rank carbonaceous material takes place at a temperature between 500 and 700° C.

23. The process of claim 15, wherein said dust includes iron oxide, and wherein said reduced metal formed by reducing said iron oxide in said heating step comprises Direct Reduced Iron.

24. The process of claim 23, including subjecting said Direct Reduced Iron to hot or cold briquetting.

25. The process of claim 24, comprising subjecting said Direct Reduced Iron to cold briquetting.

26. The process of claim 25, comprising cooling said Direct Reduced Iron in an inert atmosphere to about ambient temperature prior to said cold briquetting.

27. The process claim 11, including separating said reduced metal from said reduced carbonaceous phase in said reduced composite.

28. The process of claim 23, including heating said reduced composite in the presence of oxygen in order to combust said reduced carbonaceous phase and increase the temperature of said reduced composite sufficiently to melt the iron in said composite.

* * * * *